(12) United States Patent
Riot et al.

(10) Patent No.: US 10,710,630 B2
(45) Date of Patent: Jul. 14, 2020

(54) SYSTEM FOR MODIFICATION OF THE STEERING RATIO FOR A VEHICLE WITH A TELESCOPIC ARM, AND CORRESPONDING VEHICLE

(71) Applicant: MANITOU BF, Ancenis (FR)

(72) Inventors: Antoine Riot, Ancenis (FR); Mickael Christiny, Ancenis (FR)

(73) Assignee: MANITOU BF, Ancenis (FR)

( * ) Notice: Subject to any disclaimer, the term of this patent is extended or adjusted under 35 U.S.C. 154(b) by 98 days.

(21) Appl. No.: 15/763,337

(22) PCT Filed: Sep. 30, 2016

(86) PCT No.: PCT/FR2016/052511
§ 371 (c)(1),
(2) Date: Mar. 26, 2018

(87) PCT Pub. No.: WO2017/055774
PCT Pub. Date: Apr. 6, 2017

(65) Prior Publication Data
US 2019/0061813 A1    Feb. 28, 2019

(30) Foreign Application Priority Data
Oct. 1, 2015 (FR) ...................... 15 59356

(51) Int. Cl.
*B62D 7/15* (2006.01)
*B62D 6/00* (2006.01)
(Continued)

(52) U.S. Cl.
CPC ............. *B62D 7/1563* (2013.01); *B62D 6/00* (2013.01); *B62D 6/001* (2013.01); *B62D 6/002* (2013.01);
(Continued)

(58) Field of Classification Search
CPC ........ B62D 7/1563; B62D 6/00; B62D 6/001; B62D 6/002; B66F 9/0655; B66F 9/07568; E02F 3/286; E02F 9/225; E02F 9/265
(Continued)

(56) References Cited

U.S. PATENT DOCUMENTS 4,971,173 A    11/1990  Takahashi
6,244,373 B1    6/2001  Kojo et al.
(Continued)

FOREIGN PATENT DOCUMENTS

DE    19645651    6/1998
DE    10008984    8/2001
(Continued)

OTHER PUBLICATIONS

International Search Report dated Jun. 13, 2016.
(Continued)

*Primary Examiner* — Marthe Y Marc-Coleman
(74) *Attorney, Agent, or Firm* — Ipsilon USA

(57) ABSTRACT

A modification system is provided for modifying the steering ratio for a vehicle having a tiltable telescopic boom arm (6). The vehicle has steered wheels (11), a steering wheel, and a steering transmission device serving to transmit steering movement between the steering wheel and the steered wheels (11) with a steering ratio R=Alpha/Beta. Beta is the steering angle of the wheels, and Alpha is the turning angle of the steering wheel. The system includes a sensor configured to determine a parameter relating to the telescopic arm. A control module controls the steering ratio that is configured to modify the steering ratio R as a function of the parameter relating to the telescopic arm. A wheeled vehicle is provided, fitted with such a steering ratio modification system.

15 Claims, 3 Drawing Sheets

(51) Int. Cl.
*E02F 9/26* (2006.01)
*E02F 3/28* (2006.01)
*B66F 9/065* (2006.01)
*B66F 9/075* (2006.01)
*E02F 9/22* (2006.01)

(52) U.S. Cl.
CPC ........ *B66F 9/0655* (2013.01); *B66F 9/07568* (2013.01); *E02F 3/286* (2013.01); *E02F 9/225* (2013.01); *E02F 9/265* (2013.01)

(58) Field of Classification Search
USPC .......................................................... 701/41
See application file for complete search history.

(56) References Cited

U.S. PATENT DOCUMENTS

| | | | |
|---|---|---|---|
| 6,542,801 | B2 | 4/2003 | Kawashima |
| 7,624,836 | B2* | 12/2009 | Huang ................... B62D 6/002<br>180/421 |
| 8,862,329 | B2* | 10/2014 | Hayama ................... B66F 9/24<br>701/42 |
| 2003/0114970 | A1 | 6/2003 | Hara |
| 2005/0209752 | A1 | 9/2005 | Ono et al. |
| 2006/0180381 | A1 | 8/2006 | Sonderegger et al. |
| 2008/0116000 | A1 | 5/2008 | Huang et al. |

FOREIGN PATENT DOCUMENTS

| | | |
|---|---|---|
| DE | 10355933 | 6/2005 |
| EP | 1236638 | 9/2002 |
| EP | 2374692 | 10/2011 |
| WO | 2014047874 | 4/2014 |

OTHER PUBLICATIONS

International Search Report dated Jan. 16, 2017.
International Search Report dated Jun. 10, 2016.
U.S. Office Action dated Feb. 22, 2019.

* cited by examiner

SYSTEM FOR MODIFICATION OF THE STEERING RATIO FOR A VEHICLE WITH A TELESCOPIC ARM, AND CORRESPONDING VEHICLE

FIELD OF THE INVENTION

In general, the present invention relates to modifying the steering ratio for a wheeled vehicle, and to a corresponding vehicle.

PRIOR ART

In order to move objects between two zones, it is known to use a load-handling vehicle that the driver moves by steering the wheels in one direction in order to reach a first zone, e.g. so as to pick up a load. In order to reach a second zone for unloading, the driver must reverse and then move the vehicle forwards while steering the wheels in the other direction.

However, in order to steer the wheels in one direction or the other, i.e. in order to bring the wheels into full lock in one direction or the other, the driver must turn the steering wheel through several complete turns, which is tedious and time consuming.

Furthermore, when the vehicle includes a tiltable telescopic boom arm, e.g. provided with a bucket at its distal end, the driver must make sure to maneuver the vehicle carefully so that the vehicle does not become unbalanced by the telescopic arm and risk tipping over.

In general, it is desirable to be able to drive such a load-handling vehicle in precise, comfortable, and safe manner.

An object of the present invention is to propose a novel system and a wheeled vehicle having a telescopic boom arm making it possible to overcome all or some of the above-described problems.

SUMMARY OF THE INVENTION

To this end, the invention provides a modification system for modifying the steering ratio for a vehicle having a tiltable telescopic boom arm, the vehicle having steered wheels, a steering wheel, and a steering transmission device serving to transmit steering movement between the steering wheel and the steered wheels with a steering ratio R=Alpha/Beta, where Alpha is the turning angle of the steering wheel, and Beta is the steering angle of the wheels;

said system being characterized in that it comprises:
  a sensor configured to determine a parameter relating to the telescopic arm, e.g. an angle sensor for sensing the angle formed between the telescopic arm and the bearing plane of the wheels of the vehicle on the ground, and/or a sensor for sensing the length of the telescopic arm; and
  a control module for controlling the steering ratio, which module is configured to calculate the steering ratio R as a function of said parameter relating to the telescopic arm.

During a load handling operation with a vehicle having a tiltable telescopic boom arm, the end of which is designed to carry a load, there exists a risk of the vehicle tipping over when it is not operated in safe manner. Calculation or modification of the steering ratio as a function of one or more parameters relating to the arm, such as the angle and/or the length of said arm, makes it possible to keep the vehicle comfortable to maneuver while guaranteeing appropriate safety conditions.

According to an advantageous characteristic of the invention, said system includes a load sensor configured to determine the load at, or in the vicinity of, the end of the telescopic arm, and the module for controlling the steering ratio is configured to calculate the steering ratio R as a function of said determined load.

According to an advantageous characteristic of the invention, said system includes a sensor for sensing the turning angle of the steering wheel, and the module for controlling the steering ratio R is also configured to calculate the steering ratio as a function of a steering wheel handling parameter, preferably calculated using the turning angle of the steering wheel.

The ability to vary the steering ratio as a function of how the steering wheel is being handled, preferably as a function of the angular speed of the steering wheel, makes it possible to adapt the steering sensitivity of the vehicle to the conditions in which the vehicle is being used.

In particular, such a design makes it possible to limit the number of times the steering wheel needs to be turned completely in order to bring the wheels into full lock in one direction or the other when the driver wishes to steer the wheels quickly.

Provision may be made for the ratio to be reduced when the steering wheel is turned quickly. Conversely, when the driver wishes to approach a zone in precise manner, and to do so turns the steering wheel slowly, provision may be made for the ratio to be increased so that the driver can maintain precise movement.

Advantageously, the module for controlling the steering ratio is configured in order to calculate the steering ratio R also as a function of the travel speed of the vehicle.

Provision may be made to increase the steering ratio R as the travel speed increases in order to tend towards a default steering ratio. The term "default steering ratio" refers to the steering ratio that results from construction of the vehicle without the ratio control module being activated. Such a design facilitates maneuvering the vehicle when stopped or when at a very low speed, while maintaining safety and comfort when driving at higher speeds by limiting the reactivity of the vehicle.

According to an advantageous characteristic of the invention, said module for controlling the steering ratio R is configured to calculate the steering ratio as a function of the angular speed of the steering wheel when the speed of the vehicle is in a given speed range, referred to as a "low" speed range, with calculation of the steering ratio being independent of the angular speed of the steering wheel above this speed range, or with the influence of the angular speed of the steering wheel on the steering ratio being reduced further for a vehicle speed above this low speed range.

According to an advantageous characteristic of the invention said module for controlling the steering ratio R is configured to calculate the steering ratio as a function of the angular speed of the steering wheel when the speed of the vehicle is in a "low" speed range, in the range 0 kilometers per hour (km/h) to 10 km/h, preferably in the range 0 km/h to 8 km/h, e.g. in the range 0 km/h to 5 km/h. Provision may further be made for this range to be limited to the range 0 km/h to 2 km/h or 3 km/h.

Preferably, the steering ratio is independent of the angular speed of the steering wheel above this low speed range, or with the influence of the angular speed of the steering wheel on the steering ratio is reduced for a vehicle speed above this low speed range.

Provision may be made for the modification of the ratio as a function of the angular speed of the steering wheel to be applied over the entire vehicle speed range, e.g. from 0 km/h to 40 km/h. However, as explained above, this modification of the angular speed ratio may be limited to a range of vehicle speeds in order to inhibit or to reduce the influence of the angular speed of the steering wheel outside this range for safety reasons.

According to an advantageous characteristic of the invention, said steering wheel handling parameter of the steering wheel comprises the angular speed of the steering wheel.

According to an advantageous characteristic of the invention, said steering wheel handling parameter of the steering wheel comprises the angular acceleration of the steering wheel.

According to an advantageous characteristic of the invention, said steering wheel handling parameter comprises the angular position of the steering wheel and/or its uninterrupted angular stroke.

According to an advantageous characteristic of the invention, a plurality of angular speed ranges are defined, and the steering ratio presents different values from one angular speed range to another and/or obeys different functions from one angular speed range to another. This configuration of the system is also applicable when the steering wheel handling parameter is a parameter other than its angular speed. By way of example, this parameter may be the angular acceleration or the angular position of the steering wheel.

The invention further provides a wheeled vehicle including:
  steered wheels;
  a steering wheel; and
  a steering transmission device serving to transmit steering movement between the steering wheel and the steered wheels with a steering ratio R=Alpha/Beta, where Beta is the steering angle of the wheels, and Alpha is the turning angle of the steering wheel;
said vehicle being characterized in that it also includes a system for modifying the steering ratio as described above.

According to an advantageous characteristic of the invention, the module for controlling the steering ratio is configured in such a manner as to calculate the steering ratio from accelerator pedal depression.

According to an advantageous characteristic of the invention, the steering transmission device comprises a hydraulic circuit.

According to an advantageous characteristic of the invention, the hydraulic circuit comprises:
  a pump, also referred to as an "integral pump", making it possible to pressurize the hydraulic circuit;
  a hydraulic valve system coupled to the steered wheels;
  a steering pump making it possible to direct the steering fluid towards one side or the other of the or each valve of the hydraulic valve system as a function of the turning of the steering wheel; and
  a system for increasing flow rate, preferably a proportional solenoid valve, that can be controlled by the control module for causing additional steering fluid flow to be added into the hydraulic circuit as a function of the steering ratio defined by the control module.

According to an advantageous characteristic of the invention, the vehicle includes a first computer configured to process data from the sensor(s) and to drive the electrical actuators of the vehicle, and a second computer connected to the first computer and that includes said module for controlling the steering ratio.

According to an advantageous characteristic of the invention, said vehicle has four steered wheels.

BRIEF DESCRIPTION OF THE DRAWINGS

Other characteristics and advantages of the invention can be seen better on reading the following description, which is purely illustrative and non-limiting and should be read with reference to the accompanying drawings, in which.

DETAILED DESCRIPTION

Figure 1:
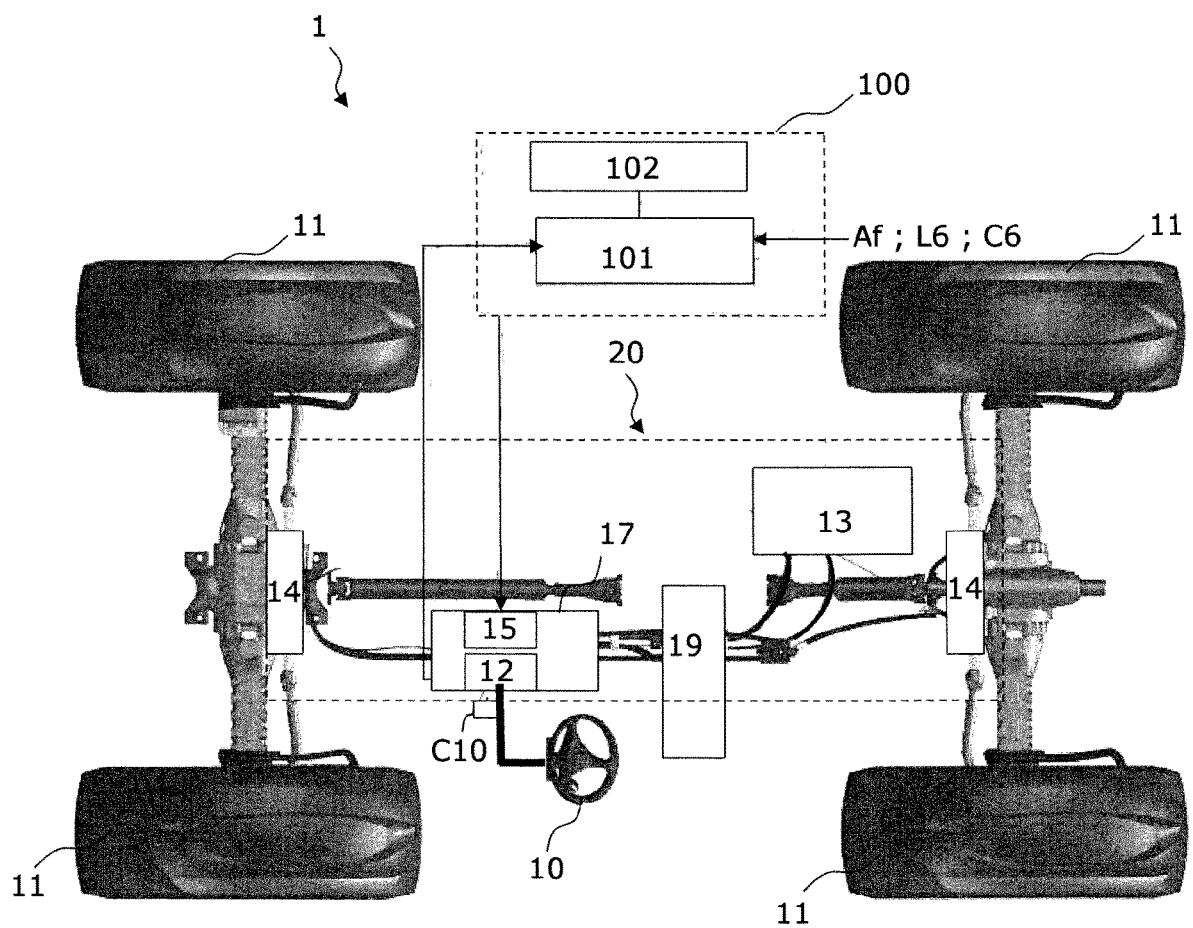
FIG. 1 is a diagrammatic plan view of a system for modifying the steering ratio for a wheeled vehicle, in accordance with an embodiment of the invention.

The concept of the invention is described more completely below with reference to the accompanying drawings, in which embodiments of the concept of the invention are shown. In the drawings, the sizes and the relative sizes of elements of the vehicle may be exaggerated for reasons of clarity. Similar numbers refer to similar elements in all of the drawings. However, this concept of the invention may be implemented in numerous different forms and should not be interpreted as being limited to the embodiments described herein. Instead of that, these embodiments are proposed so that the description is complete, and they communicate the extent of the concept of the invention to the person skilled in the art. Consequently, the extent of the invention is defined by the accompanying claims. For reasons of simplification, the embodiments below are examined in relation to the terminology and structure of a wheeled load-handling vehicle. However, the embodiments that are examined below are not limited to such load-handling vehicles, but can be applied to other wheeled vehicles having a telescopic arm.

A reference in any part of the description to "an embodiment" indicates that a particular function, structure, or characteristic described with reference to an embodiment is included in at least one embodiment of the present invention. Thus, the occurrence of the term "in an embodiment" in various places throughout the description does not necessarily refer to the same embodiment. Furthermore, the particular functions, structures, or characteristics may be combined in any appropriate manner in one or more embodiments.

Figure 2:
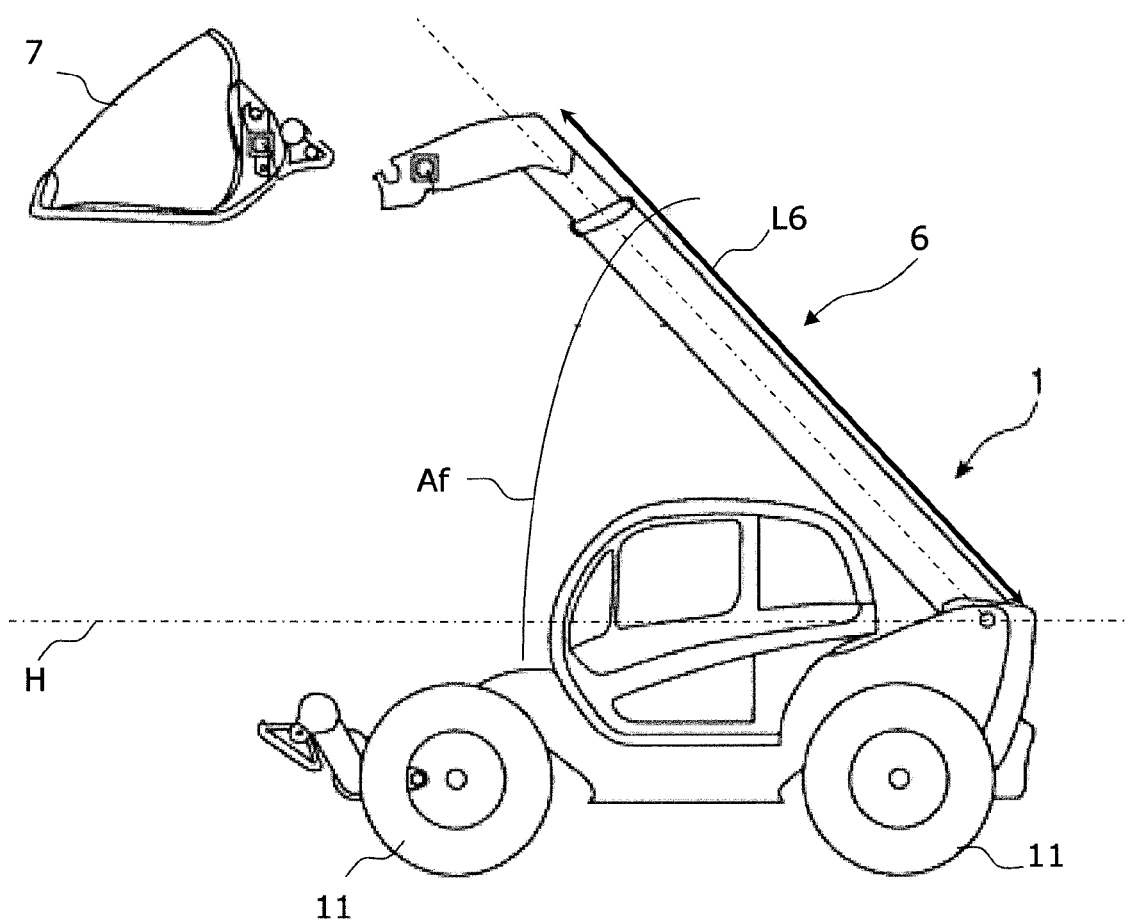
FIG. 2 is a diagrammatic side view of a load-handling vehicle, in accordance with an embodiment of the invention, the vehicle including a telescopic boom arm fitted with a bucket that is shown detached from the end of the arm.

In a particular embodiment shown in FIG. 2, the vehicle is of the type having a telescopic boom arm. The chassis of the vehicle 1 carries a telescopic arm 6 that is hinged about a substantially horizontal axis. In the embodiment shown in FIG. 2, the telescopic arm 6 is designed to be fitted at its distal end with a bucket 7. The telescopic arm 6 is raised or lowered while being tilted at an angle Af relating to the horizontal plane H. The telescopic arm 6 may be extended or retracted. The arm thus presents a length L6. The length L6 and the angle Af of the telescopic arm are measured by sensors connected to a computer of the vehicle.

In the embodiment shown in FIG. 1, the vehicle also comprises a steering wheel 10 and a sensor C10 for sensing the turning angle of the steering wheel in such a manner as to be able to calculate a parameter representative of how the steering wheel is being handled.

The sensor C10 may be arranged in such a manner as to detect the swivel angle of the steering column coupled to the steering wheel 10. The sensor C10 makes it possible to determine the angular speed of the steering wheel by differentiating the swivel angle.

The sensor C10 is connected to a computer 101 for controlling components of the vehicle. Acquiring the swivel angle of the steering wheel 10 as a function of time makes it possible for the computer 101, or another computer 102 connected to said computer 101, to calculate the angular position, the angular speed (or turning speed), the angular acceleration, and also the angular stroke covered by the steering wheel in uninterrupted manner.

In the embodiment shown in the figures, the wheeled vehicle has four-wheel steering. In a variant, provision may be made for only the front wheels of the vehicle to be steered wheels. At least two of the wheels are drive wheels. All four wheels may be drive wheels in such a manner as to enable the wheels to be steered in a crab configuration so as to be able to approach a given zone with precision.

The vehicle includes a steering transmission device 20 serving to transmit steering movement between the steering wheel 10 and the steered wheels 11. This movement is transmitted with a given steering ratio R, also referred to merely as the steering ratio. The steering ratio is defined by R=Alpha/Beta with Beta being the steering angle of the wheels, and Alpha being the turning angle of the steering wheel.

Thus, when the steering wheel 10 is turned through an angle Alpha, the steering transmission device steers the steered wheels 11 through the angle Beta defined by the steering ratio R.

With the module 102 for controlling the steering ratio of the computer, the steering transmission device 20 thus forms a variable ratio steering system making it possible to vary the ratio between the angle of the steering wheel and the angle of the wheel.

The module 102 for controlling the steering ratio is configured to calculate (or to modify) the steering ratio as a function of a parameter relating to the telescopic arm.

Preferably, said parameter comprises the angle Af formed between the telescopic arm and the ground plane on which the wheels of the vehicle bear. Said parameter may also comprise the length L6 of the telescopic arm. To this end, the vehicle includes one or more sensors, such as a sensor for sensing the angle Af formed between the telescopic arm and the ground plane on which the wheels of the vehicle bear, and/or a sensor for sensing the length L6 of the telescopic arm.

In an embodiment, the module 102 for controlling the steering ratio R is configured to calculate the steering ratio R as a function of the angle Af formed between the telescopic arm and the ground plane on which the wheels of the vehicle bear. Advantageously, the steering ratio R is also calculated as a function of the length L6 of the telescopic arm. The ground plane on which the wheels bear is usually the horizontal plane.

Provision may therefore be made for the steering ratio to be increased when the angle and/or the length increase(s) in order to reduce the risk of the vehicle tipping over (assuming that any other parameters used in the calculation remain unchanged).

The description below is based on the boom angle, but is naturally applicable to the length of the arm by defining an increasing curve of C3 (FIG. 5) as a function of the length of the arm.

Provision may thus be made for the steering ratio that is applied to be of the R=C3 type. In the example shown in FIG. 5, the value of C3 increases from a value C3_1*t*, for a given boom angle Af_min, referred to as the minimum boom angle, until it reaches a value C3_4*t*, for the maximum boom value Af_max, which by way of example lies in the range 30° to 45°, preferably 35°. Provision may be made for Af_min to lie in the range 5° to 25°, e.g. 15°.

In this configuration, the value C3_1*t* corresponds to the need to perform one complete turn of the steering wheel in order to steer the wheels from one full lock to the other, whereas the value C3_4*t* corresponds to the need to perform four complete turns of the steering wheel in order to steer the wheels from one full lock to the other.

Figure 5:
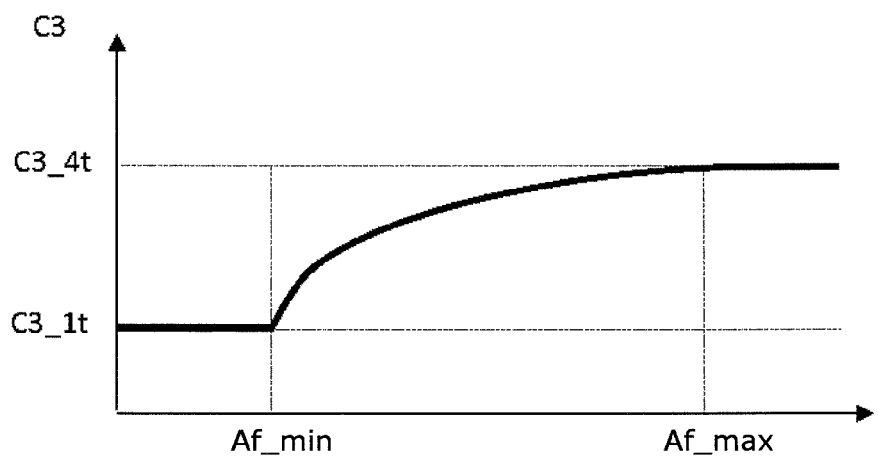
FIG. 5 is a graph providing an example curve for a correction factor for calculating the steering ratio as a function of the angle formed between the telescopic arm of the vehicle and the ground, in accordance with an embodiment of the invention.

In the embodiment of FIG. 5, the value of C3 is constant when the boom angle value lies in the range 0 to Af_min. In the embodiment of FIG. 5, the curve of C3 is of the logarithmic type from Af_min. Naturally, other types of curve may be envisaged.

In other words, assuming that possible other calculation parameters remain unchanged, the steering ratio is low when the boom angle is small, and is higher when the boom angle is greater.

Thus, taking the boom angle into account makes it possible to increase the value of the steering ratio when the angle exceeds the value Af_min, which makes it possible to further improve the maneuvering safety of the vehicle, by preventing said vehicle from tipping over.

The value of the steering ratio may also be determined as a function of one or more other parameters, such as the travel speed of the vehicle, as described below.

Preferably, the module 102 for controlling the steering ratio R is configured in such a manner as to modify the steering ratio R by also taking into account the travel speed of the vehicle. The travel speed of the vehicle may be transmitted to the control module 102 by the computer 101 of the vehicle.

In particular, provision may be made for the steering ratio R that is to be applied to be calculated based on a "main" or "standard" steering ratio, given reference R1 that is a function of the vehicle speed Vv, to which C3 is applied as a correction factor, which value C3 is a function of the boom angle. In other words, provision may be made for the steering ratio R that is to be applied to be calculated with a formula of the type:

$$R = R1 * C3$$

Figure 3:
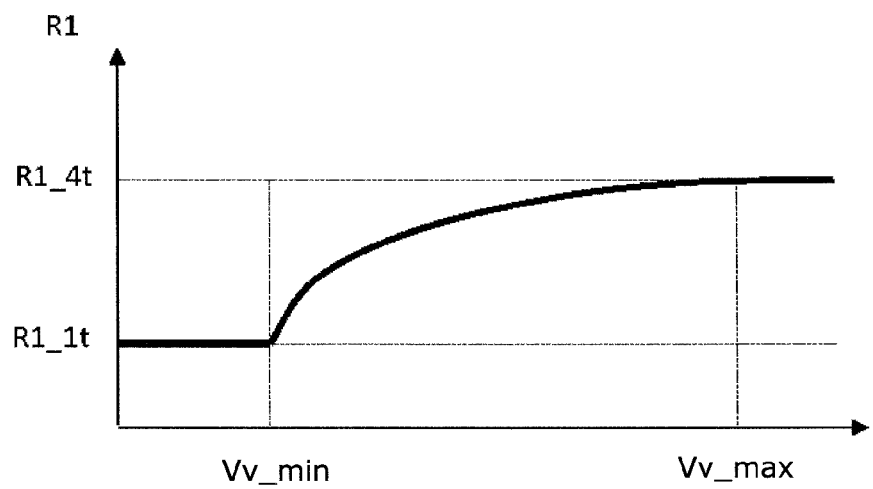
FIG. 3 is a graph providing an example curve for a main steering ratio as a function of the travel speed of the vehicle, in accordance with an embodiment of the invention.

In the embodiment shown in FIG. 3, which is a graph plotting the curve of the main steering ratio, given reference R1, as a function of the travel speed of the vehicle, given reference Vv, the main steering ratio R1 is held at a constant value (the minimum value R1_1*t*), from 0 km/h (vehicle stopped) until it reaches a given speed value, given reference Vv_min. In the embodiment shown, the minimum value R1_1*t* corresponds to the fact that the driver needs to turn the steering wheel through only one complete turn in order to steer the wheels from full lock on one side to full lock on the other side.

Above the speed Vv_min, the value of R1 increases until it reaches for Vv_max a maximum value R1_4*t* corresponding in the example shown to needing to turn the steering wheel through four complete turns in order to steer the wheels from full lock on one side to full lock on the other side. The increase in R1 with increasing speed makes it possible to increase the value of the steering ratio R that is to be applied and thus to increase the amount of angular movement the steering wheel needs to perform in order to steer the wheels, which improves driving safety.

In the embodiment in FIG. 3, the curve of R1 is of the logarithmic type from Vv_min. Naturally, other types of curve may be envisaged.

In this embodiment, C3 is used as a correction factor that is a function of the value of the boom angle. By way of example, the value C3_1*t* can be set at 1 and the value C3_4*t* at 4.

Thus, taking the boom angle into account makes it possible to increase the value of the steering ratio when the angle exceeds the value Af_min, which makes it possible to further improve maneuvering safety of the vehicle, in particular by preventing said vehicle from tipping over, in particular when vehicle speed increases.

Thus, when stopped or when at a very low speed, i.e. for a speed of the vehicle that is less than Vv_min, and when the boom angle is small, e.g. for a value Af that is less than Af_min, the steering ratio R is calculated by correcting the value of R1 (which is thus close to or equal to R1_1*t*, which corresponds to a need to perform only one complete turn of the steering wheel in order to steer the wheels from full lock on one side to full lock on the other side), by means of the correction factor C3 (having a value C3_1*t* that is low, e.g. equal to 1, due to the small boom angle. Thus when the vehicle is at low speed, and for a small boom angle, the driver can steer the wheels of the vehicle quickly since the risk of tipping over is limited.

Conversely, for a boom angle close to Af_max, the steering ratio R is calculated by correcting the value of R1 (which is thus close to or equal to R1_1*t*, which corresponds to a need to perform only one complete turn of the steering wheel in order to steer the wheels from full lock on one side to full lock on the other side), by means of the correction factor C3 (having a value C3_4*t* that is high, e.g. equal to 4, due to the large boom angle.

The computer performs the operation R=R1*C3, i.e. R=R1_1*t**4 so that the steering ratio value that is to be applied corresponds to the need to perform four complete turns of the steering wheel in order to steer the wheels from full lock on one side to full lock on the other side.

Thus, although the speed of the vehicle is low, when the boom angle is increased, the steering ratio is increased in order to limit the risk of tipping over which results from the large boom angle.

Furthermore, when the speed of the vehicle increases, e.g. in the vicinity of Vv_max and for a boom angle close to Af_max, the steering ratio R is calculated by correcting the value of R1 (which is thus close to or equal to R1_4*t*, which corresponds to a need to perform four complete turns of the steering wheel in order to steer the wheels from full lock on one side to full lock on the other side), by means of the correction factor C3 (having a value C3_4*t* that is high, e.g. equal to 4, due to the large boom angle.

The steering ratio is thus further increased in order to limit the risk of tipping over due to the combination of the increase in speed of the vehicle and the increase in boom angle.

Provision may be made for the correction factor C3 to be taken into account over the whole range of travel speeds of the vehicle or over a portion only. In an embodiment, the influence of the boom angle on the steering ratio is activated only from a given speed of the vehicle and/or from a given boom angle.

Modification of the ratio may also take account of a steering wheel handling parameter and/or of the travel speed of the vehicle as described above.

Thus, in an embodiment, the steering ratio R that is to be applied is calculated by the formula:

$$R = R1 * C2 * C3$$

Figure 4:
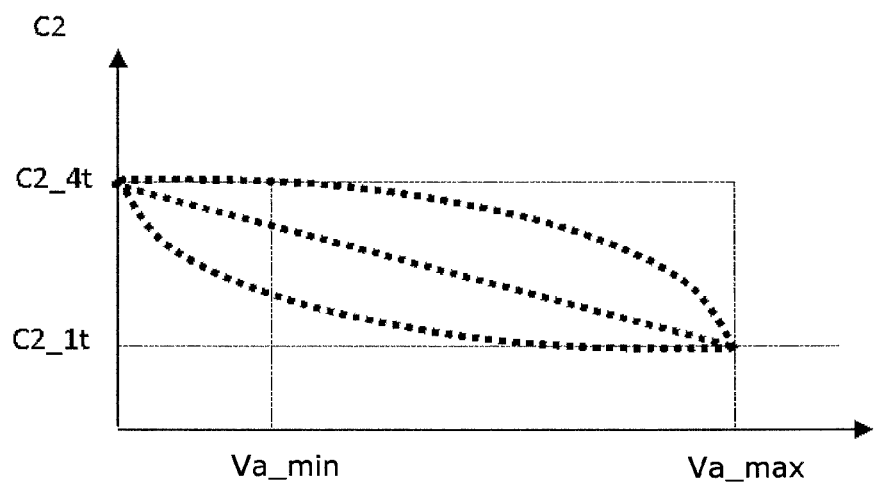
FIG. 4 is a graph providing an example curve for a correction factor for calculating the steering ratio as a function of the angular speed of the steering wheel, in accordance with an embodiment of the invention.

C2 is the correction factor that is a function of the angle value of the steering wheel. In the embodiment shown in FIG. 4, which is a graph plotting the curve of the correction coefficient C2 as a function of the angular speed of the steering wheel, given reference Va, the correction coefficient C2 is reduced when the angular speed Va of the steering wheel increases. The reduction may optionally be linear (in particular of concave or convex shape) as shown by the various dotted lines.

The control module then calculates the steering ratio R that is to be applied by correcting the main steering ratio R1 defined as a function of the speed Vv of the vehicle (FIG. 3) by the correction coefficient C2 that is defined as a function of the angular speed of the steering wheel (FIG. 4) and by the coefficient C3 (FIG. 5) defined above.

Thus, by way of example, for a given boom angle, a given vehicle speed, and when the driver turns the steering wheel slowly, e.g. for a value Va that is less than Va_min, the steering ratio R is calculated by correcting the value of R1 by means of the correction factor C3 and of the correction factor C2 having a value close to C2_4*t* that is considerable, e.g. equal to 4, due to the slow speed at which the steering wheel is being turned.

The value of Va_min may lie in the range 0 to 2 revolutions per second, preferably in the range 0 to 1 revolutions per second, or in the range 0.1 to 0.5 revolutions per second. By way of example, Va_min may be selected to lie in the range 0 to 0.2 revolutions per second.

Conversely, for a given boom angle, a given vehicle speed, and when the driver turns the steering wheel quickly, e.g. for a value Va that is close to Va_max, the steering ratio R is calculated by correcting the value of R1 by means of the correction factor C3 and of the correction factor C2 having a value close to C2_1*t* that is low, e.g. equal to 1, due to the high speed at which the steering wheel is being turned.

The computer performs the operation R=R1*C2, i.e. R=R1_1*t**1 so that the steering ratio value that is to be applied corresponds to the need to perform one complete turn of the steering wheel in order to steer the wheels between full lock on both sides.

Thus, by turning the steering wheel quickly, the operator can maneuver quickly in order to travel at low vehicle travel speed from one point to another, which is particularly useful for loading or unloading between two zones that are close to each other. There is no need to turn the steering wheel a large number of times in order to maneuver the vehicle. Conversely, the driver may operate the vehicle with precision by turning the steering wheel gently in order to position the vehicle correctly in front of the desired zone.

Provision may be made for the correction factor C2 to be taken into account over the whole range of travel speeds of the vehicle or over a portion only. The ranges in which the correction coefficients C2 and C3 are taken into account may optionally overlap, totally or in part.

Advantageously, the vehicle also includes a load sensor C6 configured to determine the load at, or in the vicinity of, the end of the telescopic arm 6. The module 102 for controlling the steering ratio is thus configured to modify the steering ratio R as a function of said determined load, which makes it possible to increase the steering ratio in the event of a load that is greater than a threshold value.

Such a configuration of the control module makes it possible to reduce the risk of the vehicle tipping over and to improve positioning accuracy of the vehicle, in particular when the driver turns the steering wheel slowly in order to move the vehicle with precision, while also making it easier to maneuver the vehicle when the driver turns the steering wheel quickly, in particular in order to change direction.

As explained above, in a particular embodiment, the module 102 for controlling the steering ratio R is configured in such a manner as to modify the steering ratio R while taking into account the boom angle and/or the length of the arm and/or the load at the end of its arm, and preferably the travel speed of the vehicle and possibly the angular speed of the steering wheel. The travel speed of the vehicle may be transmitted to the control module 102 by the computer 101 of the vehicle. Likewise, other parameters can be obtained by means of the computer and the sensors associated therewith, and then these parameters can be transmitted to the control module.

The vehicle includes a processor system 100 for computer calculation that comprises the first computer 101 configured to process data from the sensors and to control the electrical actuators of the vehicle. A second computer 102 is connected to the first computer 101. Said steering ratio control module is implemented in said second computer 102. In a variant, said first computer and the second computer may be made in the form of a single electronic and/or computer processor unit, i.e. in the form of a single computer.

The steering transmission device 20 is of the hydraulic type. In an embodiment shown in FIG. 1, the steering transmission device 20 comprises a hydraulic steering circuit put under pressure by a pump 19, also referred to as an "integral pump". The steering transmission device 20 comprises a hydraulic actuator system 14 coupled to the steered wheels 11. The hydraulic actuator system comprises hydraulic actuators that make it possible to direct the wheels in one direction or the other and at a steering angle that is given as a function of the turning of the steering wheel. In the embodiment shown in the figures, the front wheels and the rear wheels are steered wheels in such a manner that the actuator system comprises two actuators. In a variant, when only the front wheels are steered, provision may be made for the actuator system to comprise a single actuator.

The vehicle also comprises a hydraulic distributor 13, that forms a priority valve, so as to guarantee a sufficient flow rate available for the hydraulic steering circuit regardless of the other accessory hydraulic functions.

A steering pump 12, formed by a three-port valve, is coupled to the steering wheel 10 in such a manner as to deliver a steering fluid flow, provided by the integral pump 19, as a function of a parameter relating to the telescopic arm, preferably to the travel speed of the vehicle, and possibly to the speed at which the steering wheel is being turned. The steering pump 12 directs the steering fluid delivered by the integral pump 19 to one side or the other of each of the actuators 14 as a function of the direction in which the steering wheel 10 is being turned.

The vehicle also includes a proportional solenoid valve 15 that can be controlled by the control module 102 for controlling the amount of an additional steering fluid flow that is added into the hydraulic circuit as a function of the steering ratio defined by the control module.

The proportional solenoid valve may be housed with the steering pump within a single casing 17 referred to as an Orbitrol valve, or it may be arranged in some other location in the hydraulic system between the steering pump and the actuator system.

The control module 102 determines the steering ratio that is to be applied as a function of the parameter(s) determined by the sensor(s) as explained above, and thus controls, e.g. via the vehicle control computer 101, activation of the proportional solenoid valve in such a manner as to inject into the hydraulic actuator system 14 a fluid flow corresponding to the calculated steering ratio.

Provision may be made for the vehicle to include deactivation means making it possible to deactivate the control module 102 for controlling the steering ratio so that the steering ratio is the steering ratio defined by default. By way of example, deactivation may be triggered following detection of the vehicle malfunctioning.

The processor and calculation system, or the or each computer, may be made in the form of electronic components and/or of a computer processor, e.g. of the microprocessor or microcontroller type. The module for controlling the steering ratio may thus be made in the form of implemented programs that comprise computer instructions making it possible to perform their function, or in the form of dedicated electronic components.

These computer programs, or computer instructions, may be contained in program storage devices, e.g. computer-readable digital data storage media, or executable programs. The programs or instructions may also be executed from program storage peripherals.

Advantageously, provision may be made for the steering ratio to reach or to be fixed at a certain value until a given travel speed of the vehicle is reached, and then to increase the steering ratio R as the travel speed increases in order to tend towards a default steering ratio. The term "default steering ratio" refers to the steering ratio that results from construction of the vehicle without the ratio control module being activated. Such a design facilitates maneuvering the vehicle when stopped or when at a very low speed, while maintaining safety and comfort when driving at higher speeds by limiting the reactivity of the vehicle.

It should be observed that the steering ratio is conventionally defined as being equal to Alpha/Beta but, in a variant, the steering ratio could be defined as being equal to Beta/Alpha, which does not change the fact that the steering ratio is modified as a function of a parameter relating to the telescopic arm, such as the boom angle and/or the length of the telescopic arm. Naturally, the formulas for calculating the steering ratio in the various embodiments should thus be adapted to the convention being used.

The invention is not limited to the embodiments shown in the drawings. Consequently, it should be understood that, when the characteristics mentioned in the accompanying claims are followed by references, those references are included solely with the aim of improving understanding of the claims and in no way limit the ambit of the claims.

In addition, the term "comprising" does not exclude other elements or steps. Furthermore, characteristics or steps that are described with reference to one of the above-described embodiments may also be used in combination with other characteristics or steps of other above-described embodiments.

The invention claimed is:

1. A modification system for modifying a steering ratio for a vehicle having a tiltable telescopic boom arm, the vehicle having steered wheels, a steering wheel, and a steering transmission device serving to transmit steering movement between the steering wheel and the steered wheels with a steering ratio R=Alpha/Beta, where Alpha is a turning angle of the steering wheel, and Beta is a steering angle of the wheels;
said modification system comprising:
a sensor configured to determine a parameter relating to the tiltable telescopic boom arm; and
a control module for controlling the steering ratio R that is configured to calculate the steering ratio R as a function of said parameter relating to the tiltable telescopic boom arm.

2. The modification system according to claim 1, wherein, said modification system includes a load sensor configured to determine a load at, or in the vicinity of, the end of the tiltable telescopic boom arm, and the control module for controlling the steering ratio is configured to calculate the steering ratio R as a function of said determined load.

3. The modification system according to any preceding claim, wherein said modification system comprising a sensor for sensing the turning angle of the steering wheel, the control module for controlling the steering ratio R is also configured to calculate the steering ratio as a function of a steering wheel handling parameter.

4. The modification system according to claim 3, wherein said steering wheel handling parameter comprises an angular speed of the steering wheel.

5. The modification system according to claim 4, wherein the control module for controlling the steering ratio is configured to calculate the steering ratio R also as a function of a travel speed of the vehicle.

6. The modification system according to claim 3, wherein said steering wheel handling parameter comprises an angular acceleration of the steering wheel.

7. The modification system according to claim 3, said steering wheel handling parameter comprises an angular acceleration of the steering wheel and/or the angular stroke covered by the steering wheel in uninterrupted manner.

8. The modification system according to claim 3, wherein the steering wheel handling parameter is calculated using the turning angle of the steering wheel.

9. The wheeled vehicle including:
steered wheels;
a steering wheel; and
a steering transmission device serving to transmit steering movement between the steering wheel and the steered wheels with a steering ratio R=Alpha/Beta, where Beta is the steering angle of the wheels, and Alpha is a turning angle of the steering wheel;
said vehicle also including a modification system for modifying the steering ratio R in accordance with claim 1.

10. The vehicle according to claim 9, wherein the control module for controlling the steering ratio R is configured in such a manner as to calculate the steering ratio as a function of accelerator pedal depression.

11. The vehicle according to claim 9, wherein the steering transmission device comprises a hydraulic circuit.

12. The vehicle according to claim 11, wherein the hydraulic circuit comprises:
a pump, also referred to as an integral pump, making it possible to pressurize the hydraulic circuit;
a hydraulic valve system coupled to the steered wheels;
a steering pump making it possible to direct a steering fluid towards one side or the other of a or each valve of a said hydraulic valve system as a function of a turning of the steering wheel; and
a system for increasing flow rate, that can be controlled by the control module for causing additional steering fluid flow to be added into the hydraulic circuit as a function of the steering ratio defined by the control module.

13. The vehicle according to claim 12, wherein said system for increasing flow rate is a proportional solenoid valve.

14. The modification system according to claim 1, wherein said sensor is an angle sensor for sensing an angle formed between the tiltable telescopic boom arm and a bearing plane of the wheels of the vehicle on the ground.

15. The modification system according to claim 1, wherein said sensor is a sensor for sensing a length of the tiltable telescopic boom arm.

* * * * *